3,506,136
REMOVABLE RACK FOR CARGO CONTAINERS
Alfred A. Burda, El Sobrante, and Donn E. Brandow, Sacramento, Calif., assignors, by mesne assignments, to Whittaker Corporation, Los Angeles, Calif.
Filed Jan. 25, 1968, Ser. No. 700,558
Int. Cl. A47f 5/10; B65d 81/00
U.S. Cl. 211—177                                8 Claims

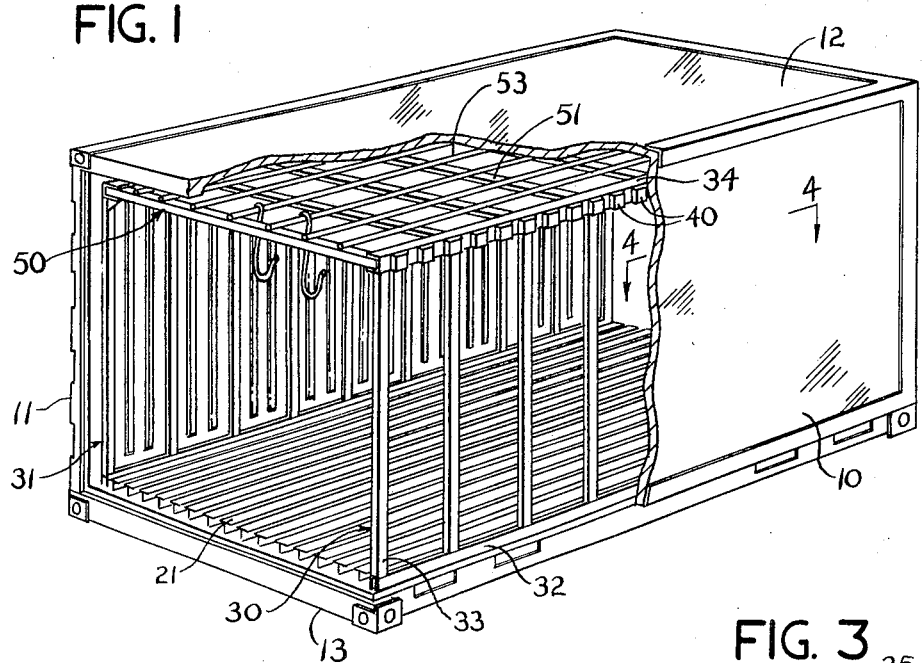
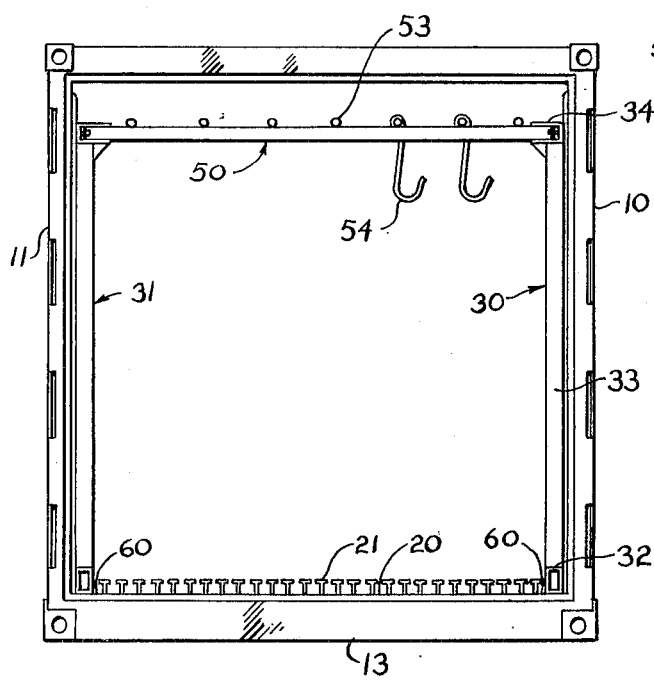
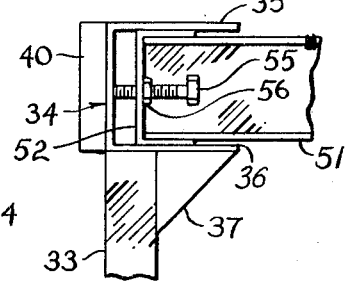
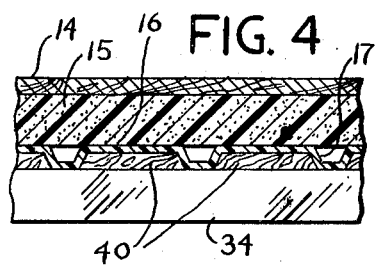
INVENTOR.
Alfred A. Burda
Donn E. Brandow United States Patent Office 3,506,136
Patented Apr. 14, 1970

ABSTRACT OF THE DISCLOSURE

A removable rack for box-like cargo containers of large capacity wherein the cargo hangs from the removable rack. The cargo container includes upwardly extending side and end walls secured between roof and floor structures. The removable rack comprises two side members slidable into the cargo container along the side walls of the container. Each of these side members has a longitudinal channel at its upper end, and a top rack is adapted to slide into the channels and is provided with rods or similar members for receiving hooks from which the cargo is to hang.

BACKGROUND OF THE INVENTION

This invention relates to container structures of large capacity and particularly to cargo containers such as those used to transport cargo by ship, rail or truck. In recent years, a considerable volume of cargo is being shipped in large box-like containers that are positioned on trailers or railroad cars for shipment on land and then loaded on ships for shipment over water. The cargo containers are transferred between such conveyances while loaded and must have sufficient strength to withstand the load imposed.

These containers are used to ship all types of commodities both in a loose form and in a package form. In addition, the containers may be provided with refrigeration units in order that perishable or frozen commodities may be shipped. The containers used for shipping perishable or frozen commodities have insulated walls and utilize a self-contained refrigeration unit. When it is desired to ship meat in the refrigerated containers, the containers are usually provided with series of rails or rods adjacent their top wall in order that the sides of meat can be hauled in a hanging position. The rails are part of the container and attach permanently to the structure of the container.

While the use of rods and rails provide a means by which the sides of meat may be loaded in the container and suspended in a hanging position, they have several disadvantages. For example, the rails being part of the container add greatly to the weight of the container while at the same time reducing the inside volume of the container. Further, they reduce the insulation in the roof or top of the container and restrict the air flow from the refrigeration unit. In addition, since the containers are normally of a light-weight construction, they do not have sufficient strength in their roof or top wall to carry the weight of the meat suspended from rails or rods attached to the roof. Thus, when the rails or rods are placed in the top of the container it necessitates reinforcing the side walls and top of the container to withstand the load of the meat hanging from the rails and rods.

In addition to the above disadvantages, containers having permanently attached rails or rods restrict the use of the container in hauling other commodities. This restriction results both from the increased weight of the container and consequent decrease in the possible load that can be carried by the container, as well as from the reduced volume of the container which also reduces the possible load that may be carried.

SUMMARY OF THE INVENTION

The present invention solves the above problems by providing a removable rack which may be placed in a container when it is desired to carry sides of meat and other commodities in a hanging position. The removable rack utilizes two side members which are placed in the container adjacent the side walls thereof. The side members are provided with a channel at their upper end for receiving a top rack. The top rack slides into the channels on the side members and is locked in position by an expansion means that forces the side members into contact with the side walls of the container. The top rack is provided with a series of cross beams that support a series of rods that extend longitudinally of a container. Suitable hooks or similar devices may be attached to the rods for hanging the meat from the top rack. When it is desired to utilize the container for hauling other commodities, the top rack and two side members are removed. The full cubic volume of the container then becomes available for hauling other commodities without restriction caused by racks or other members extending from the roof thereof.

In addition to the above advantages since the top rack is supported from the side members which rest on the floor of the container, it is not necessary to especially strengthen the side walls and top of the container. Thus, the container can be of conventional construction and its weight is not increased when it is used for carrying other commodities.

BRIEF DESCRIPTION OF THE DRAWINGS

The above advantages of this invention can be more easily understood from the following detailed description of the preferred embodiment when taken in conjunction with the attached drawings in which:

FIGURE 1 is a perspective view of a container with a removable rack installed therein and a portion of the container being removed to show the rack;

FIGURE 2 is an end view of the container shown in FIGURE 1;

FIGURE 3 is a detailed view of the channels used in supporting the top rack from the side members;

FIGURE 4 is a small section taken along line 4—4 of FIGURE 1 and showing the construction of the container and the side member mounted therein;

DESCRIPTION OF THE PREFERRED EMBODIMENT

Figure 5:
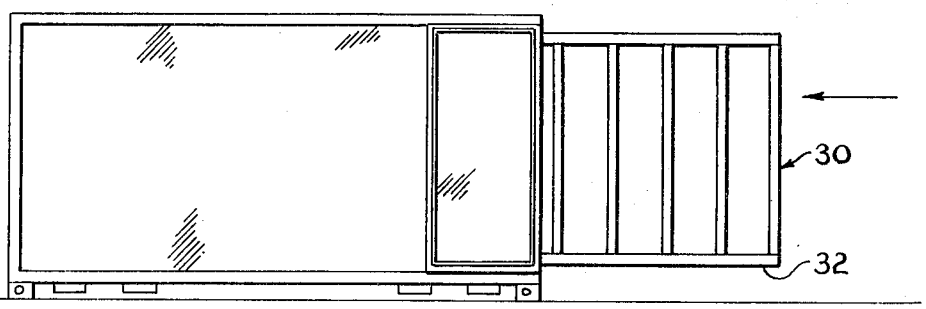
FIGURE 5 shows a container and the installation of the side member therein.

The removable rack of the present invention may be installed in a conventional cargo container or, for example, a cargo container of the type disclosed in the copending application of Russell L. Turpen, Ser. No. 559,316. The cargo container shown in FIGURES 1–4 includes a pair of vertical side walls 10 and 11 secured at their upper edges to a top wall 12. The side walls are secured at their lower edges to a floor structure 13 having suitable supporting framework. The floor may be supported by means of an outer frame and a suitable number of transverse joist members. The actual floor as shown in FIGURE 2 may consist of a floor or deck 20 having a plurality of longitudinal T-shaped members 21 attached thereto. The T-shaped members and floor may be of steel, but preferably are of aluminum to reduce the overall weight of the container.

The side walls of the container are formed from an outer panel 14 and a corrugated inner panel 16. The outer panel may be metal, plywood or similar material. Similarly, the corrugated inner wall 16 may be formed from metal such as aluminum or the like or may be formed of plastic material such as reinforced fiber glass. The outer wall and inner wall are spaced apart with the space being filled with an insulating material 15. The top wall of the container is constructed in a similar manner while the floor of the container is provided with insulation but constructed in a manner described above to have sufficient strength to support the commodities loaded in the container.

The removable rack of the present invention consists of two side members 30 and 31 that are inserted in the cargo container adjacent the side walls thereof. As seen in FIGURE 2, the lower ends of the side members are inserted in a recess 60 at the edge of the floor and rest directly on the floor of the container. Each of the side members is formed from a rectangular tubular bottom rail 32 and a plurality of rectangular tubular shaped posts or stud members 33. The lower end of each of the stud members is secured to the bottom rail by suitable means as, for example, welding or the like. The bottom rail and the vertical studs may be tubular steel members or may be tubular aluminum members to reduce the overall weight of the rack. When steel members are used they should be galvanized or otherwise treated to prevent their rusting. The use of rectangular shaped tubular members for the bottom rails and vertical studs is preferred since they provide the maximum rigidity while requiring a minimum of space. Thus, more space is available for carrying cargo. A top channel member 34 rests on the top of the vertical studs and is secured to the studs by means of welding or the like. As seen in FIGURE 3, the top channel 34 has an upper flange 35 and a lower flange 36 which extend inwardly beyond the studs and into the interior of the container. The flanges 35 and 36 must be relatively wide to provide adequate support for the edges of the top rack and prevent the top rack from slipping out of the channel as explained below. Gussets 37 are fastened to the vertical stud 33 and the bottom flange 36 to strengthen the bottom flange so that it can support the weight of the top rack and the cargo suspended therefrom.

As seen in FIGURE 4, a plurality of spacing members 40 are attached to the outer surface of the base of the channel member 34. The spacing members 40 may be formed of any suitable material, for example, wood, and are shaped to conform to the space between the corrugations of the inner wall 16 of the side walls of the cargo container. Spacing members serve to distribute the load of the side members directly to the side wall of the container instead of concentrating it at the projecting corrugation 17. In addition, the spacing members serve to lock or retain the side members in position and prevent the side members from moving out of the container after they are locked in position as explained below.

The top rack 50 slides into the channels 34 at the top of the side members. The top rack 50 consists of two side channels 52 and a plurality of I-beam type transverse members 51. The transverse members fit into the open side of the channels and are secured to the channels by suitable means such as by welding or the like. The side channels and the transverse beam members may be formed from structural steel members or may be structural aluminum members when it is desired to save additional weight. The top rack is provided with a plurality of longitudinal rods 53 that are secured to the beams 51. The longitudinal rod members may be tubular members and are used for supporting cargo hooks 54 from which the cargo hangs. For example, when meat is being transported in the cargo container the sides of meat can be hung from the hooks 54.

The top rack is provided with a plurality of expansion means that are used to force the side members outwardly into contact with the side walls of the container. The expansion means may consist of a plurality of expanding bolts 55 that thread into nuts 56 secured to the bight portion of the side channels 52 of the top rack. It is, of course, necessary to only provide an expansion means on one side of the top rack to force both the side members outwardly against the side walls of the container. Sufficient expanding means should be provided along one side of the top rack to insure that the side members are expanded outwardly into firm contact with the side walls of the container along substantially the whole length of the side members. As explained above, the spacing members 40 on the side members should be dimensioned so that the load is distributed along the side panels 16 of the container and not concentrated at the corrugations 17.

Figure 6:
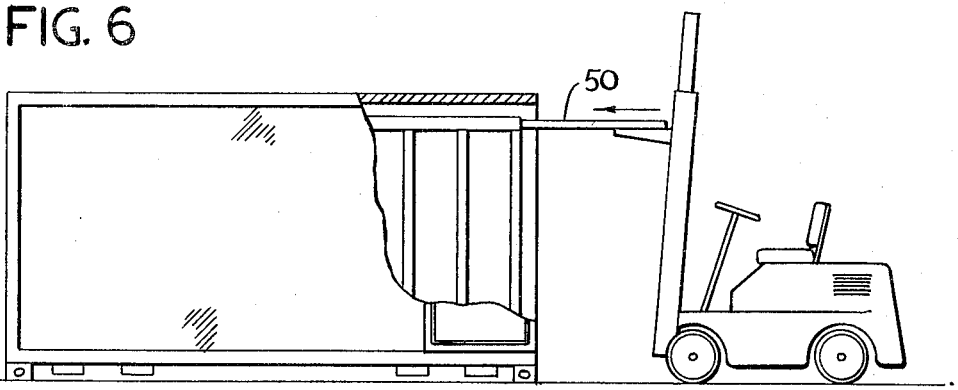
FIGURE 6 shows the container and the installation of the top rack therein.

Referring now to FIGURES 5 and 6 there is shown the installation of the removable rack in a conventional cargo container. More particularly, in FIGURE 5, there is shown the installation of one of the side members 30 in the cargo container. As explained above, the bottom rail 32 of the side members fits in a recess 60 in the corner of the cargo container and rests directly on the floor of the container. This insures that the load is transferred directly from the side members to the floor structure and not to the side walls of the container. After both side members are installed in the container the top rack 50 may be slide into the channels at the top of the side members. This may be done by lifting the top rack with a fork lift truck as shown in FIGURE 6 or the top rack may be manually lifted and slid into position. After the top rack is in position the expanding bolts 55 are expanded to force the side members outwardly into contact with the side walls of the container. This securely locks the top rack to the side members and forces the side members outwardly into contact with the side walls of the container. The spacing members distribute the load along the side walls and lock the side members in position. Since the top rack is securely locked in position it will be impossible for dangerous sidewise or other movements to develop or for the top rack to attempt to slide out of the side members.

In order to remove the rack the above steps are repeated in reverse order. The expanding bolts 55 are slacked in order that the top rack may be slid out from the side members. After the top rack is removed the two side members may be removed from the container and the container is then returned to its original condition and can then be used to ship conventional cargo.

From the above description it is readily appreciated that the present invention has provided a removable rack for cargo containers by which cargo can be hung from hooks spaced adjacent the top of the cargo container. The removable rack is of light-weight construction and thus does not materially increase the overall weight of the cargo container, yet is provided with sufficient strength to support the complete cargo load. The rack also transfers the cargo load directly to the floor and eliminates the need for specially constructed containers. The removable cargo rack permits the use of standard containers to carry cargo which must be suspended from a position adjacent the top of the container. This eliminates the necessity of utilizing especially strengthened cargo containers having side walls and a roof structure capable of carrying the load imposed by a cargo suspended from the roof of the container.

The removable rack may be rapidly installed or removed from any standard cargo container. Thus, the removable rack does not require that the cargo container be removed from use for an extended period of time while it is converted from one use to another use.

We claim:
1. A removable rack for cargo containers, said rack comprising a pair of slide supporting members for insertion into a cargo container, said side members disposed in the cargo container immediately adjacent opposite side walls of the container said side members resting on the floor of the cargo container and extending upwardly therefrom, and a top rack supported by said members adjacent the top of said cargo container, said top rack holding said side members against said side walls of said cargo container.

2. The removable rack of claim 1 wherein said side members are provided with top rack receiving channels adjacent their top portion, said top rack slideably fitting in said channels.

3. The removable rack of claim 2 wherein said top rack is provided with rod members for hanging cargo therefrom.

4. The removable rack of claim 2 wherein each of said side members is provided with a bottom rail, a plurality of spaced vertical studs, said vertical studs being secured to both said bottom rail and top rack channels.

5. The removable rack of claim 4 and in addition expanding means disposed to force the side members outwardly into contact with side walls of the container and lock said top rack in position.

6. The removable rack of claim 5 wherein said expanding means comprises a plurality of expansion bolts disposed on the top rack and operable to force said side members outwardly into contact with the side walls of the container.

7. The removable rack of claim 5 and in addition a plurality of spacing members attached to the side members adjacent the top thereof and shaped to conform to the surface of the side walls of the container.

8. The removable rack of claim 4 wherein said bottom rail and vertical studs are formed from tubular rectangular members.

References Cited

UNITED STATES PATENTS

| | | |
|---|---|---|
| 2,685,964 | 8/1954 | Brown. |
| 2,833,588 | 5/1958 | Black _____ 105—367 X |
| 2,970,004 | 1/1961 | Ratner et al. _____ 248—119 X |
| 3,316,864 | 5/1967 | Maslow _____ 211—177 X |

FOREIGN PATENTS 404,108  6/1966  Switzerland.

REINALDO P. MACHADO, Primary Examiner

W. L. SHEDD, Assistant Examiner

U.S. Cl. X.R.

206—46